Jan. 1, 1952     O. RASMUSSEN ET AL     2,580,701
BRAKE

Filed Nov. 23, 1945     5 Sheets-Sheet 1

Inventor
Olaf Rasmussen &
Richard C. Price
By Blackmore, Spencer & Flint
Attorney Jan. 1, 1952     O. RASMUSSEN ET AL     2,580,701
BRAKE Filed Nov. 23, 1945     5 Sheets-Sheet 2

Inventors
Olaf Rasmussen &
Richard C. Pike
By Blackmore, Spencer & Hint
Attorneys Jan. 1, 1952     O. RASMUSSEN ET AL     2,580,701
BRAKE
Filed Nov. 23, 1945
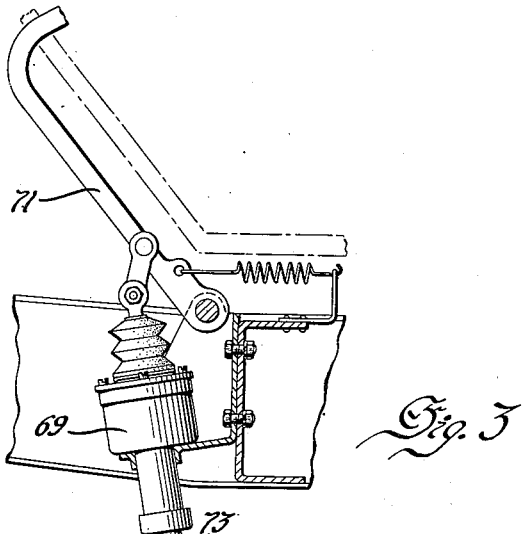
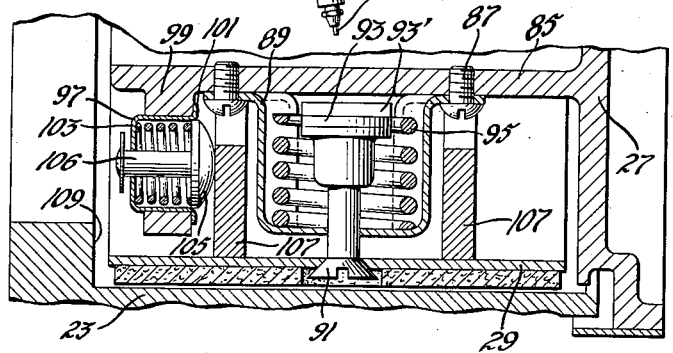
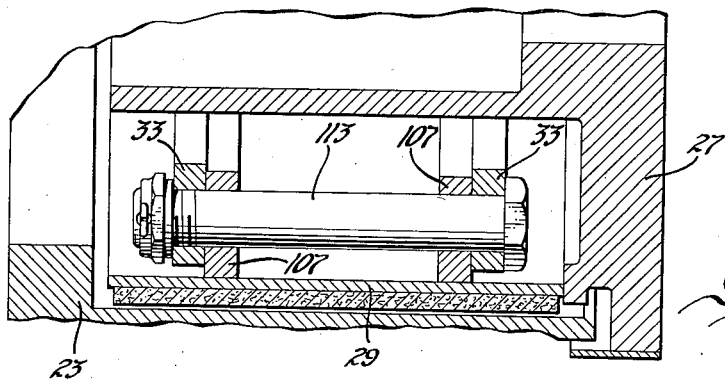

Jan. 1, 1952     O. RASMUSSEN ET AL     2,580,701
BRAKE

Filed Nov. 23, 1945     5 Sheets-Sheet 4

Inventors
Olaf Rasmussen &
Richard C. Price
By Blackmore, Spencer & Flint
Attorneys Jan. 1, 1952     O. RASMUSSEN ET AL     2,580,701
BRAKE
Filed Nov. 23, 1945     5 Sheets-Sheet 5

Inventors
Olaf Rasmussen &
Richard C. Rike
By Blackmor, Spencer & Oliet
Attorneys Patented Jan. 1, 1952

2,580,701

UNITED STATES PATENT OFFICE 2,580,701

BRAKE

Olaf Rasmussen, Port Clinton, and Richard C. Rike, Dayton, Ohio, assignors to General Motors Corporation, Detroit, Mich., a corporation of Delaware Application November 23, 1945, Serial No. 630,226

4 Claims. (Cl. 188—152)

This invention relates to improvements in brakes and particularly hydraulically actuated brakes.

It is among the objects of the present invention to provide in a brake construction having a small diameter and a wide brake shoe, improved radial and lateral guide and positioning members.

A still further object of the present invention is to provide a brake having a brake drum of minimum diametral size which is capable of providing a predetermined braking effort at a minimum rubbing velocity of the drum on the cooperating shoes, thereby contributing to the stabilization of brake performance.

In the standard brake, the drum, frictionally engaged by the brake shoes, becomes heated during braking operations and, due to said heating, will expand diametrically. Due to this enlargement of the drum, a greater brake shoe travel is required at the higher temperature of the drum than at the initial, normal temperature. This, therefore, requires the brake shoe actuating device to be adjusted to compensate for such expansion due to temperature increases in order to maintain the necessary braking effort.

The brake shoe actuator of the present invention is simplified because it need not be adjusted to compensate for expansion of the drum, but only for brake shoe wear. Simplification of the brake actuating device as well as the adjuster is rendered possible under the present invention, for the brake drum is of such a size or may be made of such a material as to limit its expansion due to temperature rises so as not to require adjustment for expansion. In the present invention, the brake drum is of such a size or is constructed of such a material as to have an expansion which does not exceed the effective operating range of movement of the brake shoe actuating device. Thus the normal travel of the actuating device is sufficient, in a predetermined range of drum expansion movements, to move the shoes into braking engagement with the drum without necessitating adjustment thereof to compensate for such drum expansion.

Further objects and advantages of the present invention will be apparent from the following description, reference being had to the accompanying drawings, wherein a preferred embodiment of the present invention is clearly shown.

In the drawings:

Fig. 3 is a diagram of a convenient operating mechanism.

Fig. 4 is a section on line 4—4 of Fig. 2.

Fig. 5 is a section on line 5—5 of Fig. 2.

Figure 1:
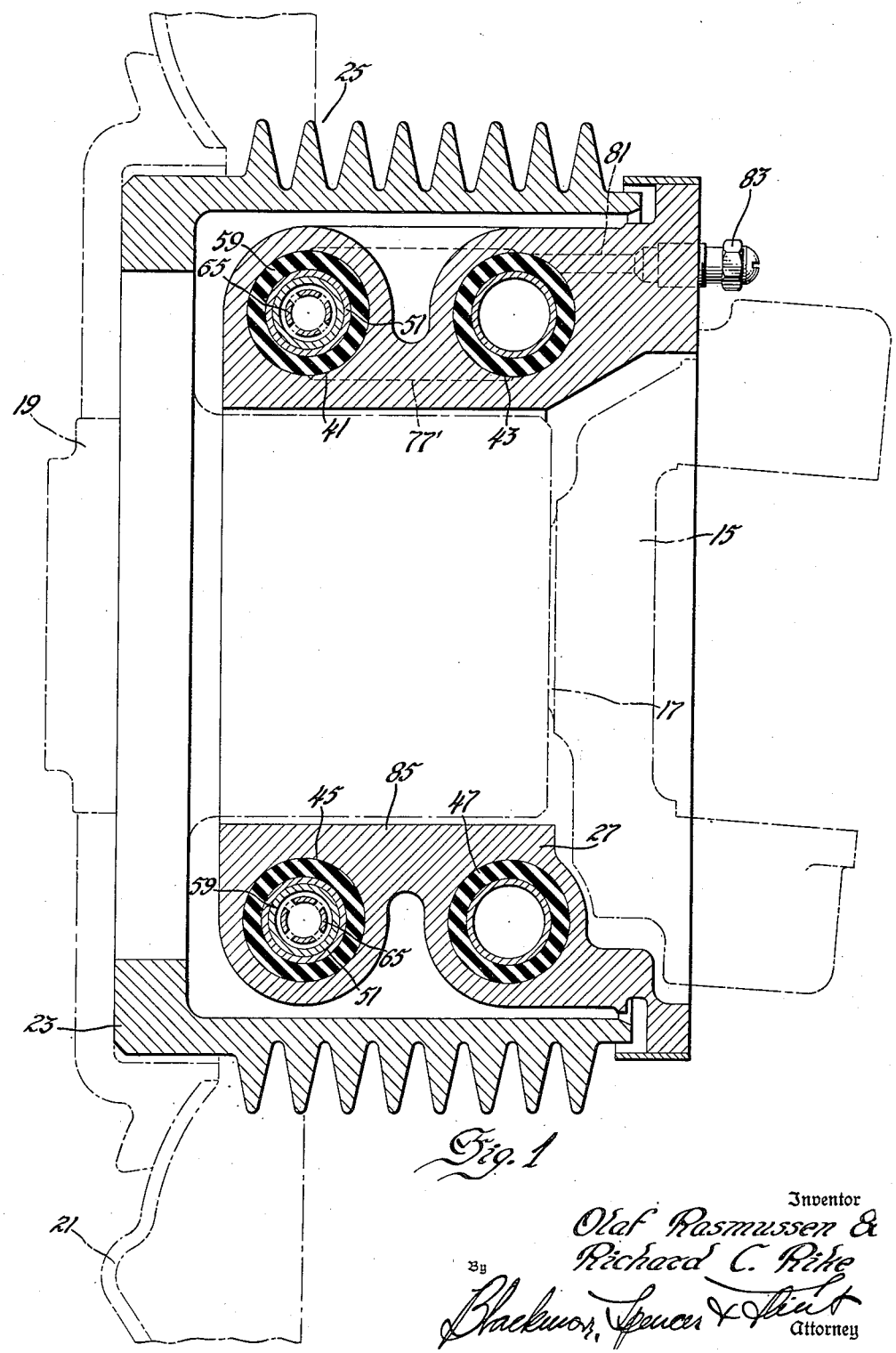
Fig. 1 is a transverse section through the brake drum of a front wheel brake.

Referring by reference character to the several figures, numeral 15 is applied to the steering knuckle to be used with the front axle of a vehicle. The supporting wheel carried by the stub axle 17 includes a hub 19, and a disc 21. The tire rim is not shown. The wheel hub is equipped with a drum 23 which is much smaller than the drum usually found on a wheel of corresponding size so that a relatively large air space 25 between the wheel rim and the drum is available for cooling the drum. Specifically the drum is but about half the diameter of the drum usually found on wheels of the size intended to be used. The knuckle carries the anchor member 27 which serves the usual purpose of anchoring the shoes and supporting the applying means.

Figure 2:
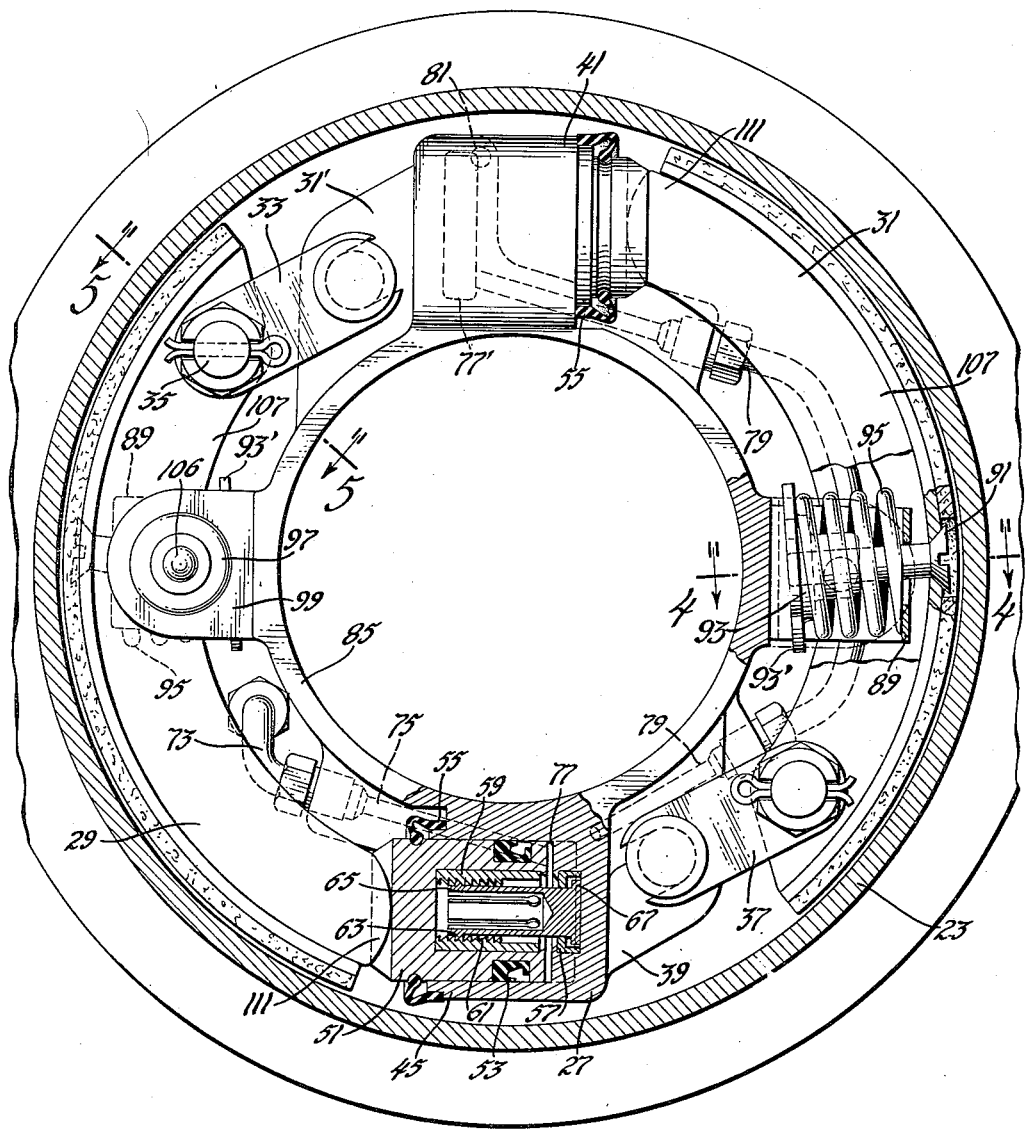
Fig. 2 is a vertical section through the drum.

From Fig. 2 it will be seen that the brake shoes are of the articulating link type. There are two shoes 29 and 31. Shoe 29 anchors on a part 31' of the anchor member 27 by the interposition of link means 33 pivoted near the end of the shoe at 35. Diametrically opposite link means 33 are other link means 37 which connect an end of shoe 31 to another anchor abutment 39.

Because of the relatively small diameter of the drum, it has been extended much more than usual in its axial dimension whereby there is a greater area of contact with wider shoes. Also we prefer to apply the brake shoes by hydraulic applying means. To provide greater effective action than could be provided by a single wheel cylinder within the restricted radial dimension available there may be secured to or formed in the anchor member two cylinders between each pair of adjacent shoe ends. These cylinders are marked 41 and 43 at the upper region of the anchor plate and 45 and 47 at the lower region. Within each cylinder is a cup-shaped piston 51 having a channeled outer end engaging the rounded end of one of the adjacent brake shoe webs 111. The piston is sealed by packing 53 and a protecting boot 55 is used between the cylinder and its piston. In one of each pair of cylinders there is added a slack adjuster to make correction for the released position of the shoes as the lining wears. To that end a slotted disc 57 is staked into the wheel cylinder adjacent its inner end.

On the inner wall of the piston or on a sleeve 59 secured therein are teeth 61. Cooperating with teeth 61 are one or more teeth 63 on the arcuate segments of an inner sleeve 65. The last named sleeve has a neck part extending slidably through disc 57 and a head 67 located between the inner end of the cylinder and the staked disc. The resiliency of the arms of sleeve 65 holds the teeth in contact with each other. When the brake is applied the clearance between the head 67 and the disc 57 permits the sleeve 65 to move outwardly with the piston. Only if more than normal movement of the piston occurs does the tooth or teeth of sleeve 65 engage an adjacent tooth of the piston and determine a new release position. The space through which the head 67 is free to move accommodates normal shoe clearance and any expansion of the drum due to heat from friction with the shoes or deflection due to forces applied. It will be noted that since the drum is much smaller than usual it is possible to provide a clearance for head 67 which might not be practicable were the drum of a larger size which would have greater expansion or deflection. The number of teeth on the piston sleeve is limited so that after a given extent of slack adjustment is made, no more adjustment will occur. The operator is thus made aware of the need for relining.

The pressure fluid flows from a master cylinder 69, the piston of which is moved by a pedal 71. The fluid flows through a conduit 73, and a connected passage 75 in the anchor to a space 77 at the back of the pistons of the lower pair of wheel cylinders, from which space a suitable conduit 79 conveys it to the space 77' at the back of the pistons associated with the upper cylinders. At the uppermost region a bleed passage 81 and closure plug 83 permits the removal of the contents.

In Fig. 2 and Fig. 4 there is shown a spring device operable to withdraw the shoes when the hydraulic pressure is released. To a flange 85 integral with the anchor plate 27 is secured as at 87 a U-shaped member 89. The brake shoe carries a bolt 91 extending radially therefrom and into the hollow of the member 89 where it has a nut 93 with two opposed ears 93' (Figure 2) which project through the side openings of U-shaped member 89. Between the ears 93' of the nut and the arch of member 89 is a releasing spring 95. There may be two of these shoe releasing devices, one for the mid-portion of each shoe as illustrated.

Means should be provided to hold the shoes toward the anchor plate and away from the drum. This is best shown by Fig. 4. A hollow stamping 97 is fitted into an opening in a flange 99 extending from the anchor plate flange 85. It has a holding flange 101 engaging flange 99 and seats a spring 103 which acts on the head 105 of a bolt 106 pressing it against a shoe web 107. This pressure prevents the shoe moving toward and contacting with the face 109 of the drum.

It will be seen from Fig. 5 that at the link connected ends of the shoes a bolt or pin 113 extends through the two webs and the links 33 are rotatably supported by a friction joint on the ends of the pins.

Figure 7:
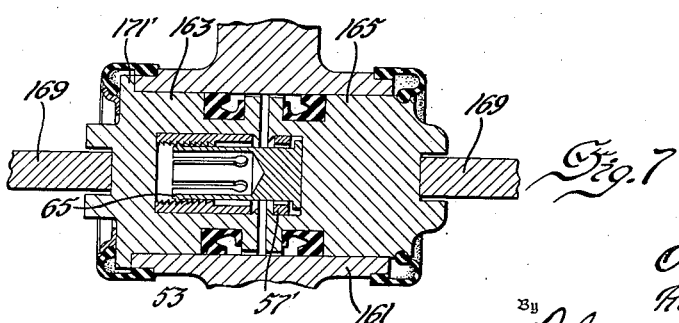
Fig. 7 is a section on line 7—7 of Fig. 6.

The brake mechanism thus far described is intended for use as a front wheel brake. It will be readily seen that the two shoes are self-energized by drum contact to give self-energized frictional retarding in one direction only of drum rotation. In checking reverse driving, this type of brake is relatively inefficient since the applied force in the case of both shoes acts against the braking forces produced by drum rotation. It is, however, an arrangement especially effective for checking forward travel and is believed to be desirable for front wheels. Rearward vehicle movement is slow and it is considered unnecessary to provide maximum braking on front wheels. This brake construction when employed on vehicles having standard wheels of 15 or 16 inches in diameter will produce the same retarding force with a brake drum of not more than seven inches in diameter as the conventional brake with a drum having a diameter of 11 to 14 inches. With the small brake drum of seven inches or less in diameter the normal temperature rise of about 600° F. will not expand the diameter of the drum more than .035 of an inch or the circumference more than .110 of an inch. When this expansion and distortion of the drum during brake application is reduced to this small value due to the small diameter drum, the lost motion of the stem or sleeve 65 mounted on the cylinder as shown in Figure 2 or on the other piston as shown in Figure 7 may be reduced. Thus the lost motion of stem 65 is made equal to the movement of the piston normally necessary to move the shoe into braking engagement with the drum at a given normal operation temperature, and then a distance of not more than .0505 of an inch to maintain said braking engagement for expansion and distortion of the small drum due to temperature rises during the braking. With this small seven-inch drum the small expansion does not require a noticeable increase in the lost motion required in the slack adjusted above the normal slack employed at constant normal temperatures to prevent the brake from binding due to the contraction of the drum onto the shoes.

In the application of this invention to rear wheels there will be described an arrangement wherein self-energization is provided for the shoes in their work of checking rearward as well as forward travel although that nicety of drum engagement by the shoes occasioned by the link anchorage is available only in the act of checking forward travel. It may be added that the arrangement for rear wheels could also be adopted for front wheels if it should be desired. In this second form the invention has been shown with single cylinders instead of with pairs of cylinders, it being believed that in many installations it will be entirely possible to apply the shoes without the duplication of wheel cylinders described above.

Figure 6:
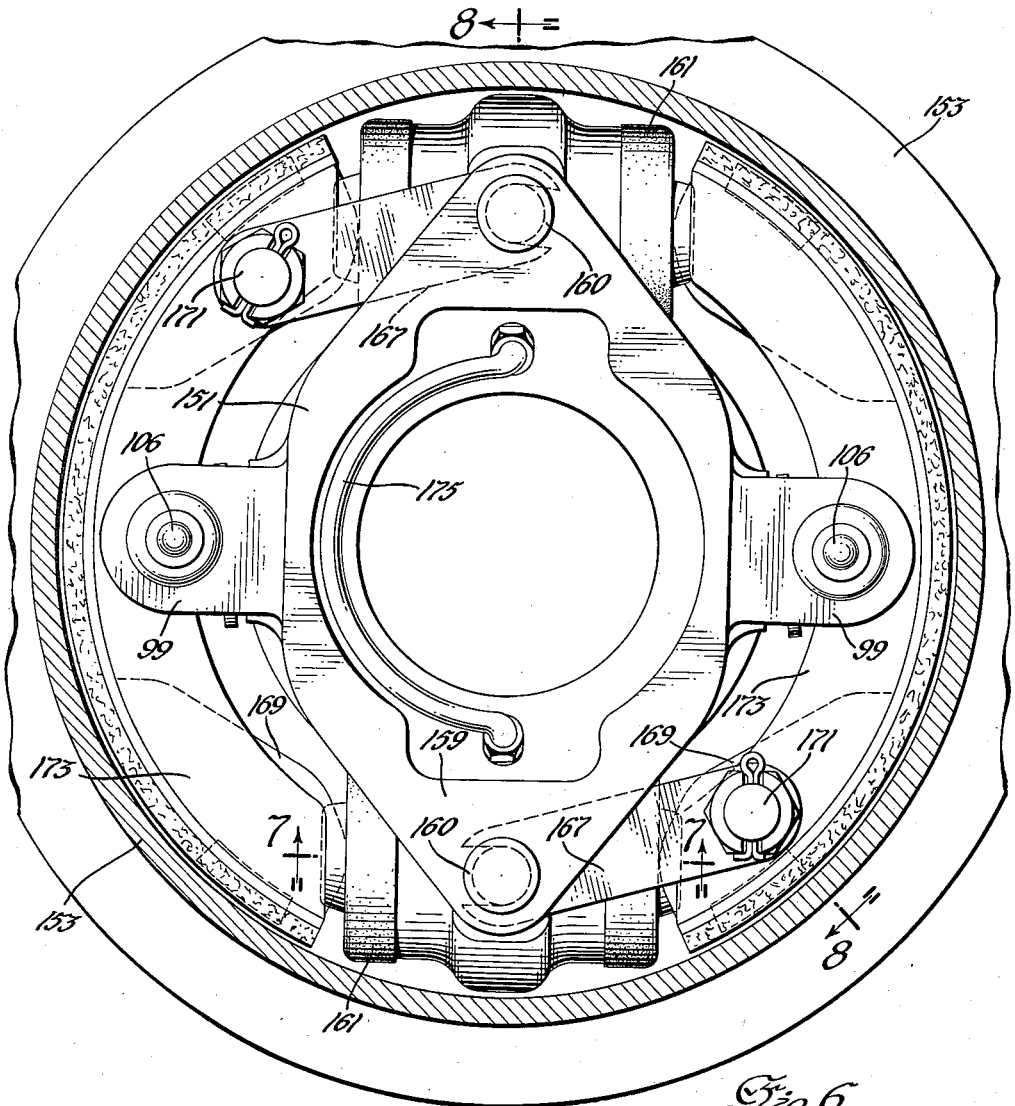
Fig. 6 is a vertical section of a modification in which the invention may be embodied.
Figure 8:
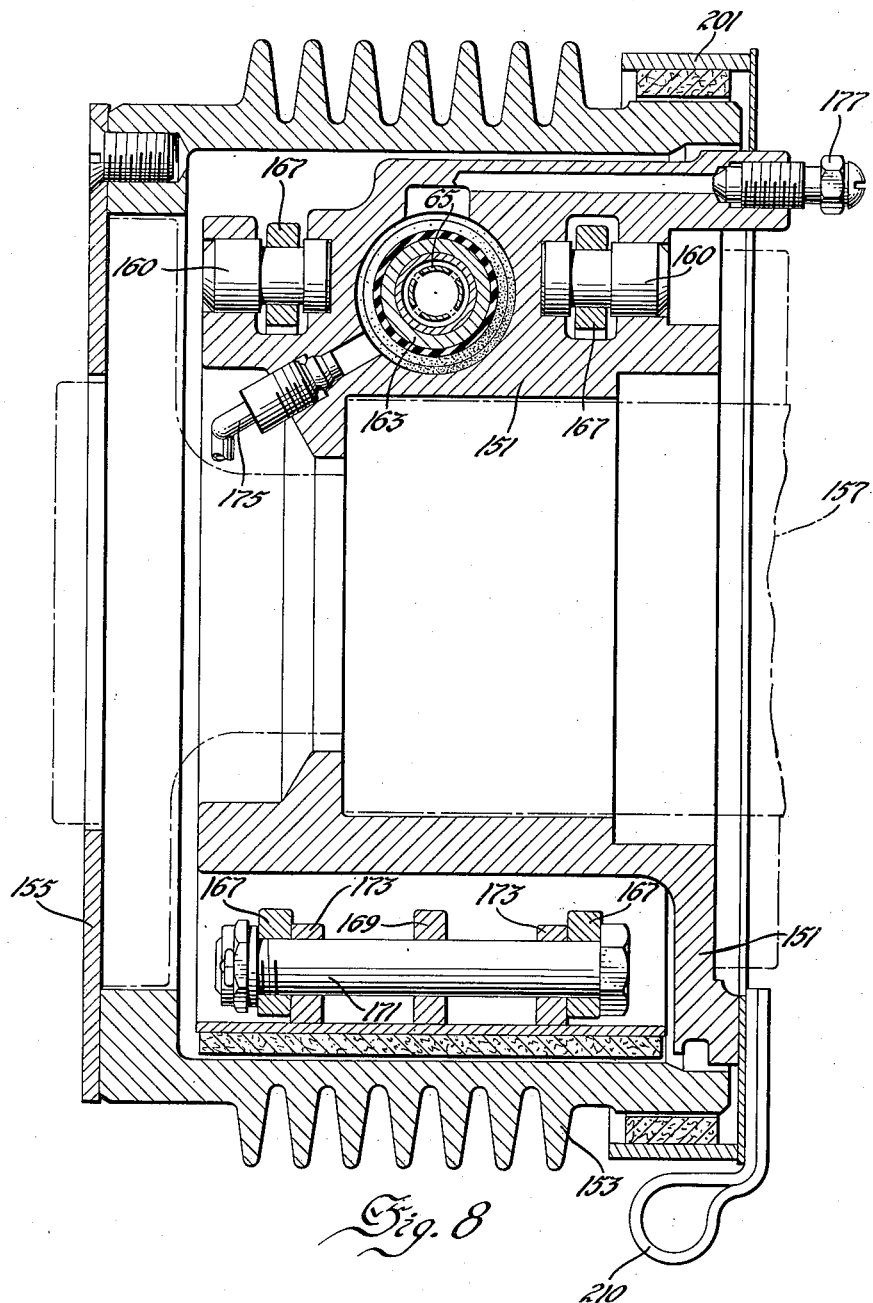
Fig. 8 is a section on line 8—8 of Fig. 6.

Considering then, Figures 6, 7 and 8, numeral 151 is used to designate the shoe torque taking anchor. It is rigid with the axle housing as usual. The small brake drum 153 is carried by the wheel 155 in any convenient way. The anchor closes the open end of the drum (Fig. 8) and has an annular part projecting over the axle bearing 157 and into the hollow drum. Radially enlarged parts 159 are formed with cylinders 161 open at both ends within which are pistons 163 and 165 (Fig. 7). Each anchor enlargement carries pins 160 on each side of the cylinder for the support of links 167 connected to the ends of one of the shoes. Intermediate reinforcements 169 at both ends of both shoes are engaged by the recessed ends of the pistons. One of the pistons of each pair is associated with the slack adjuster which, except for its supporting means in the other piston, is like that of Fig. 2. The provision for brake release and for holding the shoe away from the drum is like that shown by Fig. 4 and need not be again described. At the link ends of the shoes are bolts or pins 171 carried in this case by shoe webs 173 and by reinforcement 169 as shown by Fig. 8. A suitable conduit from the master cylinder is connected in any convenient manner to the space between the pistons of the lower wheel cylinder and the upper cylinder derives its source of fluid from a pipe 175 leading from the lower cylinder. Provision for bleeding the wheel cylinders is seen at 177.

With this arrangement, forward vehicle travel is to be understood as causing rotation of the drum shown in Fig. 6. The lower left piston applies the left shoe which anchors by means of its link 167. At the same time the upper right piston applies the right shoe anchoring by means of its links. The nice fit with the drum because of the links and self-energization caused by drum rotation supplementing the applied force makes this a very effective brake. For reverse travel the right lower piston pushes the right shoe, the adjacent link leaving its anchor pin and similarly the left upper piston applies the left shoe. The drum rotation thus aids the hydraulic application for checking reverse as well as forward travel. It will be seen that a shoulder 171' on the piston anchors on the cylinder end in the case of reverse travel.

With the unusually long drum it is convenient to employ a separate emergency brake of either the external or the internal kind.

Figure 8 shows an external contracting band 201 which may be applied in any convenient way. If the external band 201 is mechanically actuated, a conventional loop 210 is used to support the rod or cable (not shown).

While the embodiment of the present invention as herein disclosed, constitutes a preferred form, it is to be understood that other forms might be adopted, all coming within the scope of the claims which follow.

What we claim is as follows:

1. In a brake, a small drum, a plurality of brake shoes within said drum to engage its internal surface, an anchor plate, an anchor extension, a pair of longitudinal flanges on each shoe, one flange being adjacent said anchor plate and the other remote from said anchor plate, a pair of wheel cylinders on said anchor extension between said shoe ends, piston means in said cylinders engaging a pair of said flanges to spread said shoes, spring means positioned between said flanges and mounted on said anchor extension and secured to said shoes to retract said shoes, lateral positioning spring means mounted on said anchor extension and engaging the remote side of said remote flange to hold it in contact with said anchor plate.

2. In a brake, a small drum, a plurality of brake shoes within said drum to engage its internal surface, an anchor plate, an anchor extension, a pair of longitudinal flanges on each shoe, one flange being adjacent said anchor plate and the other remote from said anchor plate, a pair of wheel cylinders on said anchor extension between said shoe ends, piston means in said cylinders engaging a pair of said flanges to spread said shoes, lateral positioning spring means mounted on said anchor extension outside of said remote flange and engaging the outer surface of said remote flange to laterally hold said shoe.

3. The invention defined in claim 1, another piston means in said first cylinder acting on said one of said shoes and another piston means in said second cylinder acting on said other of said shoes.

4. In a brake, a small diameter wide brake drum, a pair of wide brake shoes within said drum to engage its internal surface, a pair of longitudinal webs on each of said shoes, an anchor, a pair of wheel cylinders between each pair of adjacent shoes ends, means operatively connected to said cylinders and to each adjacent end of the brake shoe webs to spread the shoes, means carried by said anchor and operatively connected to said shoes to resiliently withdraw said shoes from drum contact, said last-named means being a U-shaped member secured to said anchor and extending between the flanges on one shoe, a coil spring seated at one end on the base of said U-shaped member, a bolt having a head secured to the shoe and carrying an abutment engaging the other end of the spring within said U-shaped member.

OLAF RASMUSSEN.
RICHARD C. RIKE.

REFERENCES CITED

The following references are of record in the file of this patent:

UNITED STATES PATENTS

| Number | Name | Date |
| --- | --- | --- |
| 1,076,562 | Duffy | Oct. 21, 1913 |
| 1,644,378 | Hirschler | Oct. 4, 1927 |
| 1,668,730 | Pearson | May 8, 1928 |
| 1,696,729 | Rackham | Dec. 25, 1928 |
| 1,825,555 | Stern | Sept. 29, 1931 |
| 2,100,488 | Rasmussen | Nov. 30, 1937 |
| 2,111,297 | Pontius | Mar. 15, 1938 |
| 2,138,206 | Rasmussen et al. | Nov. 29, 1938 |
| 2,146,009 | Chase | Feb. 7, 1939 |
| 2,158,700 | Hoyt | May 16, 1939 |
| 2,263,949 | Harle | Nov. 25, 1941 |
| 2,283,654 | Sinclair | May 19, 1942 |
| 2,382,927 | Whitacre | Aug. 14, 1945 |
| 2,404,326 | Taylor | July 16, 1946 |

FOREIGN PATENTS

| Number | Country | Date |
| --- | --- | --- |
| 226,949 | Great Britain | Jan. 8, 1925 |
| 472,103 | Great Britain | Sept. 16, 1937 |
| 802,619 | France | June 13, 1936 |